United States Patent Office 3,758,289
Patented Sept. 11, 1973

3,758,289
PREREDUCTION PROCESS
James M. Wood, Jr., Baton Rouge, La., assignor to Ethyl Corporation, Richmond, Va.
No Drawing. Filed May 1, 1970, Ser. No. 33,953
Int. Cl. C22b 21/02; C22c 1/00; C22d 7/06
U.S. Cl. 75—10
18 Claims

ABSTRACT OF THE DISCLOSURE

Aluminum-silicon alloy is produced from aluminum-containing ores in a two-step process. The first step includes heating aluminum-containing ore to a temperature of from about 1500° C. to about 1800° C., the heat being supplied by a fossil fuel. The second step of the process includes transferring the product of the first step to an electric arc furnace and heating the product to a temperature of from about 2000 to about 2300° C.

BACKGROUND OF THE INVENTION

This invention relates to a process for the production of aluminum from aluminum-containing ores.

Alumina-silica ores have been used as raw materials in processes for the production of aluminum. Alumina-silica ores are ores containing alumina ($Al_2O_3$) and silica ($SiO_2$) in various proportions. In producing aluminum from alumina-silica ores it is necessary to add carbon to the ore and to heat the ore-carbon mixture to the reaction temperature range. Once at the reaction temperature range a large additional amount of heat must be supplied to drive the smelting reaction to completion. The following are typical smelting reactions for kyanite ore $$(Al_2O_3 \cdot SiO_2)$$

and dehydrated kaolin ore ($Al_2Si_2O_7$):

(a) (kyanite) $Al_2O_3 \cdot SiO_2 5C \rightarrow 2Al + Si + 5CO$  $\Delta H 2227°$ C.=635 Kcal.
(b) (kaolin) $Al_2Si_2O_7 + 7C \rightarrow 2Al + 2Si + 7CO$  $\Delta 2227°$ C.=860 Kcal.

The heat (1 Kcal.=1000 calories) required for each reaction includes the heat required to heat the ore-carbon mixture from 25° C. to 2227° C., plus the heat required to melt the ore, plus the heat of reaction at 2227° C.

The heat required for these reactions is usually supplied by an electric arc furnace. Arc furnaces are very expensive to build and to operate. The arc furnace is the largest investment item in a carbothermic aluminum process, and may account for as much as 40 percent of the total plant investment. Thus it is desirable to find a means of reducing the heat required to be produced in an arc furnace in a given smelting process. Reducing the heat required to be produced by arc furnaces will reduce the number of arc furnaces required for a given level of metal production and effect a substantial saving in investment.

It is not possible to change the overall heat requirements for the reduction process illustrated by reactions "a" and "b" shown above. However, it is possible to carry out each reaction in two steps and to effect an economic savings thereby.

THE INVENTION

It is an object of the present invention to provide a new process for the production of aluminum-silicon alloys.

It is an additional object of the present invention to provide a process for the production of aluminum-silicon alloys which results in substantial economic savings and advantages.

It is another object of the present invention to provide a process for the production of aluminum-silicon alloys wherein the aluminum-containing ore is partially reduced prior to smelting in an electric arc furnace.

The present invention consists of a process for the production of aluminum-silicon alloys from alumina-silica ores. The first step of the process of the present invention includes reducing the silica in alumina-silica ores to silicon carbide in a kiln or furnace which is heated by a fossil fuel such as coal, coke or petroleum coke. The second step of the process of the present invention includes smelting the ore which has been heated in the first step in an electric arc furnace to produce an aluminum-silicon alloy.

Prereduction is the term applied to reducing the silica in alumina-silica ores to silicon carbide in a separate kiln or furnace upstream of the furnace where aluminum-silicon alloy is produced. The prereduced ore is added to the arc furnace along with additional carbon, if needed, and smelted to yield aluminum-silicon alloy.

Less heat is required to smelt prereduced ore than is required to smelt unmodified ore. Thus the throughput of a given arc furnace is increased and the number of arc furnaces required for a given level of metal production is correspondingly reduced.

The reactions which occur in the prereduction step are as follows:

(c) (kyanite) $Al_2O_3 \cdot SiO_2 + 3C \rightarrow Al_2O_3 + SiC + 2CO$
(d) (dehydrated kaolin) $Al_2Si_2O_7 + 6C \rightarrow$
$Al_2O_3 + 2SiC + 4CO$ The prereduced ores are then mixed with additional carbon and smelted in the arc furnace. The additional carbon can also be added before the prereduction step. The prereduction reactions are preferably carried out at approximately 1500 to 1800° C. A more preferred temperature range is 1600–1700° C. They are preferably carried out by using heat supplied by burning a fossil fuel such as coal, coke or petroleum coke.

The following reactions occur upon smelting the prereduced ore in the electric arc furnace:

(e) (kyanite) $Al_2O_3 + SiC + 2C \rightarrow 2Al + Si + 3CO$
$\Delta H = 458$ Kcal.
(f) (kaolin) $Al_2O_3 + 2SiC + C \rightarrow 2Al + 2Si + 3CO$
$\Delta H = 504$ Kcal.

The heat requirements for reactions "e" and "f" include the heat required to heat the prereduced ore-carbon mixture from 25° C. (ambient temperature) to about 2000° C., plus the heat required to melt the aluminum oxide, plus the heat required to carry out the reaction at the preferred reaction temperature of 2000° C. to 2300° C. By comparison with equations "a" and "b" it can be seen that prereduction effects a substantial reduction in the heat which must be supplied by the arc furnace to accomplish smelting. For kyanite, the heat required for complete smelting in an electric arc furnace is 635 Kcal., whereas in the process of the present invention, only 458 Kcal. are required in an electric arc furnace for the smelting of kyanite. For the complete smelting of dehydrated kaolin in an electric arc furnace 860 Kcal. are required, whereas in the process of the present invention only 504 Kcal. are required in an electric arc furnace.

Thus, part of the process heat in the present invention is supplied by burning a cheap fossil fuel rather than expensive electric power. Hence the process of the present invention reduces operational costs as well as investment cost. It is also possible to carry out prereduction using heat supplied by other means, such as by induction heating. This will not effect any savings in power cost, but will reduce the investment in the arc furnace area.

All alumina-silica ores are suitable for use in the process of the present invention. Preferred ores include kyanite, kaolin, and diaspore ($Al_2O_3 \cdot H_2O + SiO_2$). Most commercial grades of alumina-silica ores contain small amounts of impurities such as iron or titanium, for example, which have no significant effect on the process of the present invention.

Prereduction is preferably conducted in a protective atmosphere. Preferred atmospheres are carbon monoxide and mixtures of carbon monoxide and nitrogen. Argon or helium may be substituted for nitrogen.

Catalysts may also be included in the reactants. Suitable catalysts include $NaF$, $CaCl_2$, $Na_2CO_3$, $Na_3AlF_6$, and $AlF_3$. Preferred catalysts are $NaF$ and $CaCl_2$.

The reactants may be either in powdered form or pellet form. The powder may be bound together in pellet form, preferably by adding molasses to the powdered reactants. Other suitable binders include bentonite and pitch. The pellet size preferably ranges from about ⅜ inch to about 1 inch.

Carbon may be added if the ores do not contain sufficient carbon to react with all of the silica present in the ores. Suitable carbon sources include coal, charcoal, petroleum coke, and metallurgical coke (coke containing less than about 8% ash). Preferred carbon sources are petroleum coke, coal, and metallurgical coke.

The benefits and advantages of the present invention are more readily understood in the examples displayed in the following table. In each of the examples the reactants were placed in a high temperature furnace, heated to the indicated temperatures, and the product was analyzed. The furnace was completely enclosed so that the atmosphere in the furnace could be controlled.

Examples I–V demonstrate prereduction in an atmosphere of carbon monoxide. Pellet size was about one-half inch. In this atmosphere no prereduction occurs at 1550° C. The preferred prereduction temperature range is 1500–1800° C. A more preferred temperature range is 1600–1700° C. When operating in the latter range, the product consists primarily of $Al_2O_3 + SiC$, with a little $SiO_2$ and free carbon. Small amounts of iron and titanium are also present. Sugar present in the reactants is a residue from the molasses binder used to bind the reactant particles together. It has no effect on the reduction process. Other binders which have been used with equally advantageous results include petroleum pitch, coal tar pitch, and bentonite.

Example VI demonstrates the advantage of using an atmosphere of $CO + N_2$ in the vicinity of the pellets. Pellet size was about one-half inch. At 1550° C. there is a 33 percent conversion of silicon to SiC with a $CO + N_2$ atmosphere, whereas with a pure CO atmosphere there is no conversion. This advantage occurs because reducing the partial pressure of CO in the atmosphere around the reactants drives reactions "c" and "d" to the right.

Examples VII and VIII demonstrate that diaspore or kaolin can be reduced to mixtures which are primarily $Al_2O_3 + SiC$. Pellet size in Example VII was about one-half inch. These examples also substantiate the previously mentioned conclusion that the presence of an inert gas in the atmosphere around the pellets drives reactions "c" and "d" to the right.

Examples IX, X, and XI were run to test the effects of catalysts. Example IX has no catalyst, and some mullite ($Al_6Si_2O_{13}$) was detected in the product by X-ray diffraction analysis, indicating incomplete conversion of $SiO_2$ to SiC. Examples X and XI cover $NaF$ and $CaCl_2$ catalysts. No mullite was detected in the products, indicating essentially complete conversion of $SiO_2$ to SiC in the products. $Na_2CO_3$, $Na_3AlF_6$ and $AlF_3$ were also found to exert a catalytic effect on the conversion of $SiO_2$ to SiC.

TABLE OF PREREDUCTION EXAMPLES

| Example | 1 | 2 | 3 | 4 | 5 | 6 | 7 | 8 | 9 | 10 | 11 |
|---|---|---|---|---|---|---|---|---|---|---|---|
| Reactant, wt. g | 34.8 | 26.9 | 7.09 | 28.9 | 25.5 | 28.7 | 15.5 | 4.8 | 10.6 | 11.3 | 10.9 |
| Product, wt. g | 27.3 | 18.9 | 4.84 | 16.2 | 16.2 | 20.2 | 10.5 | 1.9 | 7.1 | 7.4 | 7.1 |
| Reactant form | Pellet | Pellet | Pellet | Pellet | Pellet | Pellet | Pellet | Powder | Powder | Powder | Powder |
| Reactant composition, wt. percent: | | | | | | | | | | | |
|   Diaspore | | | | | | | | 82.9 | 79.0 | | |
|   Kaolin | | | | | | | | | | | 71.4 |
|   Kyanite | 71.1 | 71.1 | 68.8 | 71.1 | 68.8 | 71.1 | | | | 72.5 | |
|   Coal | 27.8 | 27.8 | | 27.8 | | 28.7 | | | | | |
|   Charcoal | | | | | | | 17.1 | 21.0 | 73.1 | | |
|   Pet. coke | | | 27.9 | | 27.9 | | | | | 26.9 | 26.7 |
|   Other constituents | 1.1 (sugar) | 1.1 (sugar) | 3.4 (sugar) | 1.1 (sugar) | 3.4 (sugar) | 1.1 (sugar) | | | | | .91 (NaF) |
| Protective atmosphere | CO | CO | CO | CO | CO | $CO+N_2$ | Argon | Argon | Argon | Argon | 2.4 ($CaCl_2$) |
| Temperature, °C. | 1,555 | 1,600 | 1,625 | 1,650 | 1,690 | 1,550 | 1,550 | 1,580 (±60) | 1,555 | 1,570 | Argon. |
| Reaction time | 1 hour | 1 hour | 25 minutes | 1 hour | 1 hour | 1 hour | 1.75 hours | 1.25 hours | 3.31 hours | 3 hours | 1,570. |
| Product composition, wt. percent: | | | | | | | | | | | 3.16 hours. |
|   $Al_2O_3$ | 47.6 | 54.0 | 54.6 | 63.5 | 59.4 | 53.1 | 68.7 | 61.5 | | | |
|   SiC | 0.0 | 14.6 | 20.1 | 20.3 | 20.8 | 7.3 | 13.0 | 32.9 | | | |
|   $SiO_2$ | 31.3 | 12.8 | 9.4 | 5.6 | 4.3 | 21.9 | 9.6 | | | | |
|   Free carbon | 17.4 | 10.9 | 15.3 | 3.0 | 9.4 | 12.3 | 2.1 | 1.2 | | | |
|   Other | 1.5 | 1.8 | 1.6 | 2.1 | | 1.8 | | | | | |

[1] 44.5 V percent CO – 55.5 V percent $N_2$.

What is claimed is:
1. A process for the production of aluminum-silicon alloys comprising:
   (a) heating an alumina-silica ore in the presence of carbon in a furnace heated by a fossil fuel to a temperature sufficiently high enough to reduce the silica in said ore to silicon carbide;
   (b) transferring the product produced in step (a) to an electric arc furnace for further reduction; and,
   (c) heating the product produced in step (a) in the electric arc furnace to a temperature sufficiently high enough to convert said silicon carbide to elementary silicon and the alumina in said ore to elementary aluminum.

2. The process of claim 1 wherein said alumina-silica ore is heated in said fossil fuel heated furnace to a temperature of from about 1500° C. to about 1800° C. to reduce said silica in said ore to silicon carbide.

3. The process of claim 1 wherein said product produced in step (a) is heated in said electric arc furnace to a temperature of from about 2000° C. to about 2300° C. to convert said silicon carbide to elementary silicon and said alumina to elementary aluminum.

4. The process of claim 1 wherein said alumina-silica ore is kaolin.

5. The process of claim 1 wherein said alumina-silica ore is kyanite.

6. The process of claim 1 wherein said alumina-silica ore is diaspore.

7. The process of claim 1 wherein a catalyst is added to said ore prior to reducing said silica in said ore.

8. The process of claim 7 wherein said ore is heated in a protective atmosphere.

9. The process of claim 8 wherein said atmosphere is carbon monoxide.

10. The process of claim 8 wherein said atmosphere is a mixture of nitrogen and carbon monoxide.

11. The process of claim 7 wherein said catalyst is NaF.

12. The process of claim 11 wherein the catalyst is $CaCl_2$.

13. A process for the production of aluminum-silicon alloys comprising:
   (a) mixing carbon with an alumina-silica ore;
   (b) heating the mixture of carbon and alumina-silica ore to a temperature of from about 1500° C. to about 1800° C. in an enclosed furnace containing a protective atmosphere, the heat being supplied by burning a fossil fuel;
   (c) transferring the product produced in step (b) to an electric arc furnace for further reduction; and
   (d) heating said product produced in step (a) in the electric arc furnace to a temperature of from about 2000° C. to about 2300° C.

14. The process of claim 13 wherein said protective atmosphere is carbon monoxide.

15. The process of claim 13 wherein said protective atmosphere is a mixture of carbon monoxide and nitrogen.

16. The process of claim 13 wherein a catalyst is added to said ore prior to mixing said ore with said carbon.

17. The process of claim 16 wherein said catalyst is NaF.

18. The process of claim 17 wherein said catalyst is $CaCl_2$.

References Cited
UNITED STATES PATENTS

| | | | |
|---|---|---|---|
| 3,215,522 | 11/1965 | Kuhlmann | 75—10 |
| 3,661,562 | 5/1972 | Seth | 75—68 R |
| 2,986,459 | 5/1961 | Udy | 75—13 |
| 2,804,295 | 8/1957 | Brooke | 75—445 |
| 3,353,807 | 11/1967 | Sixel | 75—10 R |
| 3,163,520 | 12/1964 | Collin | 75—10 R |
| 3,351,462 | 11/1967 | Arentzen | 75—10 R |
| 3,117,175 | 1/1964 | Kohlmeyer | 75—143 |
| 2,488,568 | 11/1949 | Striplin | 75—10 A |
| 3,149,960 | 9/1964 | Robinson | 75—68 R |
| 3,254,988 | 6/1966 | Schmidt | 75—68 R |
| 3,355,281 | 11/1967 | Hansley | 75—68 R |
| 3,189,491 | 6/1965 | Robbins | 148—26 |
| 2,894,831 | 7/1959 | Old | 75—26 |
| 2,327,065 | 8/1943 | Reimers | 75—96 |
| 3,486,884 | 12/1969 | Baille | 75—68 R |
| 3,434,824 | 3/1969 | Johnston | 75—68 R |
| 2,398,443 | 4/1946 | Munday | 75—68 R |

L. DEWAYNE RUTLEDGE, Primary Examiner

P. D. ROSENBERG, Assistant Examiner

U.S. Cl. X.R.

75—68, 135

PO-1050
(5/69)

UNITED STATES PATENT OFFICE
CERTIFICATE OF CORRECTION

Patent No. 3,758,289        Dated September 11, 1973

Inventor(s) James M. Wood, Jr.

It is certified that error appears in the above-identified patent and that said Letters Patent are hereby corrected as shown below:

Column 1, line 39, reads "$Al_2O_3 \cdot SiO_2 5C \rightarrow 2Al+Si+5CO$ $\Delta H 2227°$", should read -- $Al_2O_3 \cdot SiO_2+5C \rightarrow 2Al+Si+5CO$ $\Delta H_{2227}°$ -- . Column 1, line 41, reads "$\Delta 2227°$", should read -- $\Delta H_{2227}°$ -- . In the Table, Column 4, line 7, reads "79.0" between Examples 8 and 9, should read -- 79.0 -- under Example 8. In the Table, Column 4, line 9, reads "28.7" under Example 6, should read -- 27.8 -- under Example 6. In the Table, Column 4, line 12, reads "1.1 (sugar" under Example 4, should read -- 1.1 (sugar) -- under Example 4.

Signed and sealed this 5th day of March 1974.

(SEAL)
Attest:

EDWARD M. FLETCHER, JR.
Attesting Officer

C. MARSHALL DANN
Commissioner of Patents